United States Patent [19]
Heyne et al.

[11] 4,456,843
[45] Jun. 26, 1984

[54] BRUSHLESS DYNAMOELECTRIC MACHINE WITH IMPROVED CONTROL WHEEL ASSEMBLY

[75] Inventors: Carl J. Heyne, Hampton Township, Alleghany County; Donald T. Hackworth, Monroeville, both of Pa.

[73] Assignee: Westinghouse Electric Corp., Pittsburgh, Pa.

[21] Appl. No.: 499,625

[22] Filed: May 31, 1983

[51] Int. Cl.[3] .............................................. H02K 11/00
[52] U.S. Cl. .................................. 310/68 D; 310/68 R; 310/43
[58] Field of Search ............... 310/68 D, 68 R, 42, 310/43, 68 B, 68 C; 318/174; 335/296, 299, 302, 304, 305

[56] References Cited
U.S. PATENT DOCUMENTS

| | | | |
|---|---|---|---|
| 2,897,383 | 7/1959 | Barrows et al. | 310/68 D |
| 3,829,725 | 8/1974 | Peterson et al. | 310/68 D |
| 3,838,303 | 9/1974 | Ernst | 310/68 D |
| 3,845,369 | 10/1974 | Heyne | 318/174 |
| 3,872,335 | 3/1975 | Peterson | 310/68 D |
| 4,161,775 | 7/1979 | Franz et al. | 310/68 D |

*Primary Examiner*—Mark O. Budd
*Attorney, Agent, or Firm*—G. H. Telfer

[57] ABSTRACT

A brushless dynamoelectric machine is provided with a molded insulating control wheel having a rim on whose inner surface the rectifiers and other components of the starting control circuitry are directly mounted and an outer surface on which a wire-wound starting resistor can be provided with provision for good support and adequate ventilation of the resistor so as to achieve a more compact and less expensive to assemble control wheel.

17 Claims, 5 Drawing Figures

BRUSHLESS DYNAMOELECTRIC MACHINE WITH IMPROVED CONTROL WHEEL ASSEMBLY

BACKGROUND AND SUMMARY OF THE INVENTION

This invention relates generally to brushless dynamoelectric machines and, more particularly, to rotatable control wheel assemblies for such machines that carry components of the excitation control circuit.

Solid-state control circuit technology has been used for some time to provide brushless excitation for dynamoelectric machines such as synchronous motors. An example is disclosed in Hoffmann et al. U.S. Pat. No. 3,414,788, Dec. 3, 1968. By the use of such circuitry, large synchronous motors have been provided which do not require the use of brushes to excite the field winding of the motor. Such brushless machines have become quite popular since they offer advantages of reduced maintenance, the absence of brush replacement requirements, and the absence of sparks that could be hazardous in a combustible atmosphere. The system as it has been used previously has performed well, but is limited to motors of relatively large size, such as greater than about 5000 HP. It would be desirable to reduce the cost of the system in order to permit application to smaller size machines such as in the range from about 500 to 5000 HP.

The cost of the prior system is in large part due to the construction methods employed in the rotating control wheel which houses the electronic control circuitry and starting resistors. Reference is made to FIG. 1 which is a brushless motor control circuit in partial schematic form illustrating the exciter armature 10, diode rectifier 12, and other control circuitry 14, including starting resistor R, for supplying excitation to a motor field winding 16 as has been implemented in the past, such as in the above-referenced Hoffmann et al. Patent, which is incorporated herein by reference and shows further circuit details. The elements of FIG. 1 are all arranged for rotation together.

FIG. 2 shows how the control elements 12 and 14 of FIG. 1 have been previously arranged on a rotating structure. A wheel 17 is fabricated by rolling two aluminum rings 18 and 20 which are machined and welded to an aluminum plate 22 which forms a web connecting the outer ring 18 to the inner hub 20. The completed wheel is machined at the internal surface of the hub 20 which mates with the shaft 24 and on the outer and inner surfaces of the outer ring or rim 18, to the tolerances required for balance and shaft mounting. The view of FIG. 2 is of half of the structure which is substantially symmetrical about the center line of the shaft 24. The control wheel 17 provides support for the rotating control components which are fastened to it. Diode D is representative of the diodes and thyristors of elements 12 and 14 of FIG. 1. Each such component is mounted on a heat sink 26 secured to the rim 18 but insulated by insulation 28. Since the wheel is metallic, all diode heat sinks 28 and connecting cable and copper straps 30 must be insulated from the wheel 17. In addition, all bolted connections to the rim 18 which secure diode heat sinks 26 must be insulated.

Synchronous motors which are line-started (started in an induction mode) must have provision for current flow in the field winding during the starting sequence. For this purpose, systems such as that shown in FIG. 1 utilize a starting, or field discharge, resistor R which is connected across the field winding during the starting sequence when SCR1 is on as a result of a pulse at its gate electrode. FIG. 2 shows how the starting resistor is arranged in commercial apparatus presently being made. The current system uses commercially available magnesium-oxide insulated, cut-steel sheathed strip heaters 32 for these resistors. These heaters 32 are large elements which have little heat storage capacity and they also provide no hoop strength. This means that they heat quickly and have no excess mass to store heat and also require a large diameter control wheel since they cannot be rolled to a small diameter without damage and many heater elements are required to provide sufficient resistor capacity thus extending the length of the wheel.

The combination of bulky resistors, labor-intensive control wheel assembly (particularly for insulation of connections and bolts) and expensive, labor-intensive control wheel construction (particularly in required machinery or machining) have resulted in a brushless synchronous motor control system that is physically larger and more expensive than what would be preferred.

The inadequacies of prior systems like that of FIG. 2 have been recognized and attempts previously made to design a more cost effective unit. Heyne U.S. Pat. No. 3,845,369, Oct. 29, 1974, incorporated herein by reference, describes a system in which the strip heaters for the starting resistor are replaced with a wire resistor wound onto an aluminum control wheel. This configuration was practiced and was successful in reducing the size of the control wheel significantly. Problems developed, however, with the integrated resistor when it was discovered that the control circuitry in the system was not always operating properly. Corrective circuitry was provided to solve this problem as disclosed in Heyne et al. U.S. Pat. No. 4,038,589, July 26, 1977, incorporated herein by reference, but still resulted in an undesirable number of resistor failures due to inadequate cooling of the resistor. The various problems associated with the control circuitry of the brushless exciter have also given rise to a desire for a standardized control wheel on which there can be readily mounted a set of test collector rings to monitor the operation of the circuitry in either shop or field tests.

Among the features of the present invention, not all of which need to be used together to obtain advantages, is to provide a low-cost insulating, molded control wheel for mounting the circuit components and the starting resistor. The invention decreases control wheel fabrication and assembly costs and further, with the use of a new starting resistor arrangement, reduces the size of the control wheel. Materials are available, such as glass polyesters, which are structurally strong and can be molded to close tolerances without significant shrinkage. The type of materials referred to are generally those that have been previously used for molded, insulating cases for electrical distribution and interruption equipment and in such applications as high-pressure arc chutes for circuit breakers. These materials have proven to be inexpensive to manufacture in a variety of shapes and are extremely rugged so they are comparable to metals such as aluminum. The ability to mold these materials to close tolerances allows the use of intricately shaped pieces which cost little to manufacture and require no manual labor or machining after molding.

In one form of implementing the invention, the control wheel comprises a mass of molded insulating material that provides, in a unitary structure, a central hub for mounting with the shaft, a radial plate and an axially running rim spaced from the hub. The electrical components of the excitation control circuitry are mounted directly on the inner surface of the rim and require no additional insulation. The starting resistor is a wire-wound element wound on the outer surface of the rim and held thereon by molded insulating clamp elements and/or glass banding for radial support. Additionally, the outer surface of the rim is channeled and the coils of the resistor are spaced in a manner to provide vent passages therethrough.

In alternate forms of the invention, the unitary mass of molded insulating material comprises the control wheel in combination with at least one metal support element which is electrically isolated by the molded insulating material from the elements of the rectifier bridge and starting control circuit.

The resistor arrangement above described is of such benefit as to be advantageous to use even with presently configured metal control wheel where adequate insulation is provided between the resistor and the surface of the wheel.

Numerous additional features and advantages of the present invention will be understood from the ensuing description. While the description is primarily directed to brushless systems for synchronous motors, it will be understood that some features, such as the molded insulating control wheel, are applicable to brushless systems for a dynamoelectric machine which can be either a synchronous motor, synchronous generator, or DC motor. In instances such as large synchronous generators where other means for starting is provided, the invention may be practiced without the use of a starting resistor as implemented in the embodiments described herein.

DESCRIPTION OF PREFERRED EMBODIMENTS

Figure 1:
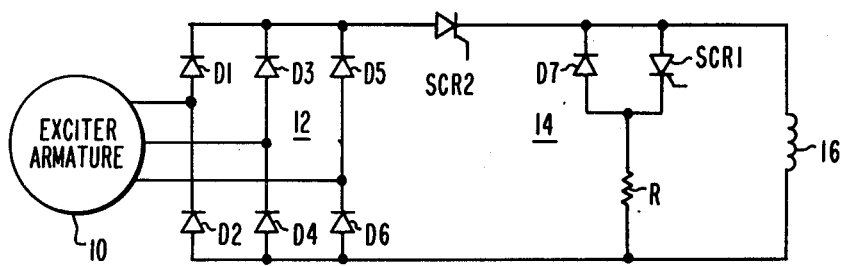
FIG. 1 is a partial circuit schematic of a brushless motor control circuit in accordance with the prior art and one which may be implemented by the present invention.
Figure 2:
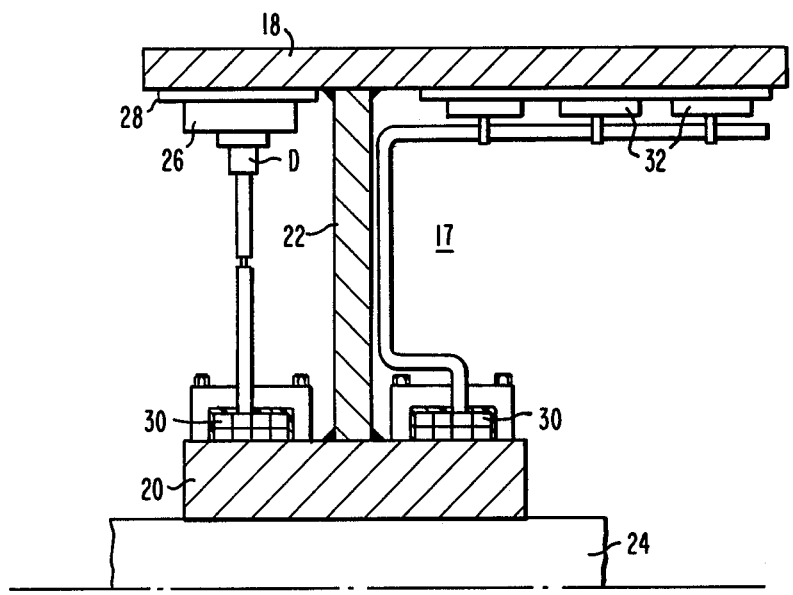
FIG. 2 is a partial schematic view of a control wheel configuration in accordance with the prior art.

Referring first to the prior art configuration of FIG. 1, the operation of the circuit is described in above-mentioned Patent No. 3,414,788, and will not be fully described herein. The circuit is shown here to illustrate generally the components which make up the circuit and are mounted on the rotating control wheel. Diodes D1 to D6 form a three-phase full wave rectifier bridge which provides DC current to a silicon-controlled rectifier, SCR2. A gate pulse on SCR2, supplied by a synchoronizing module (not shown), applies the DC current to the motor field winding for synchronous operation. Diode D7, thyristor SCR1, and the gating circuitry for SCR1, provide a means for controlling the flow of field current through starting resistor R. The control wheel, shown in the prior art in the form as depicted in FIG. 2, acts as a mechanical support for the seven diodes, two thyristors and starting resistor and other elements which may comprise the brushless circuit.

Figure 3:
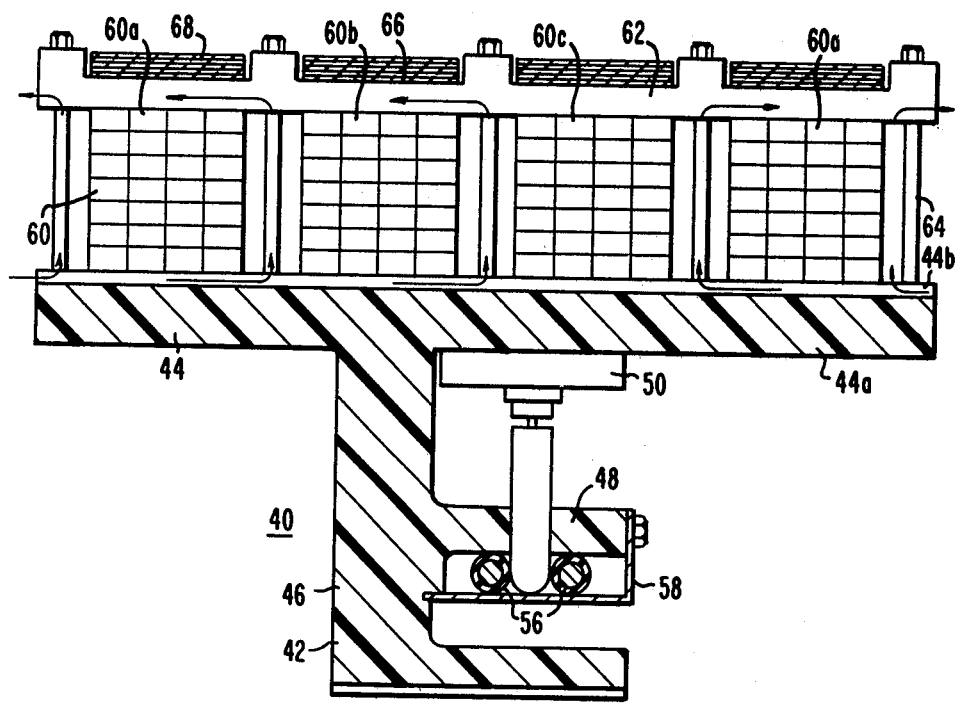
FIG. 3 is a partial sectional view of an embodiment of a control wheel assembly in accordance with the present invention.
Figure 4:
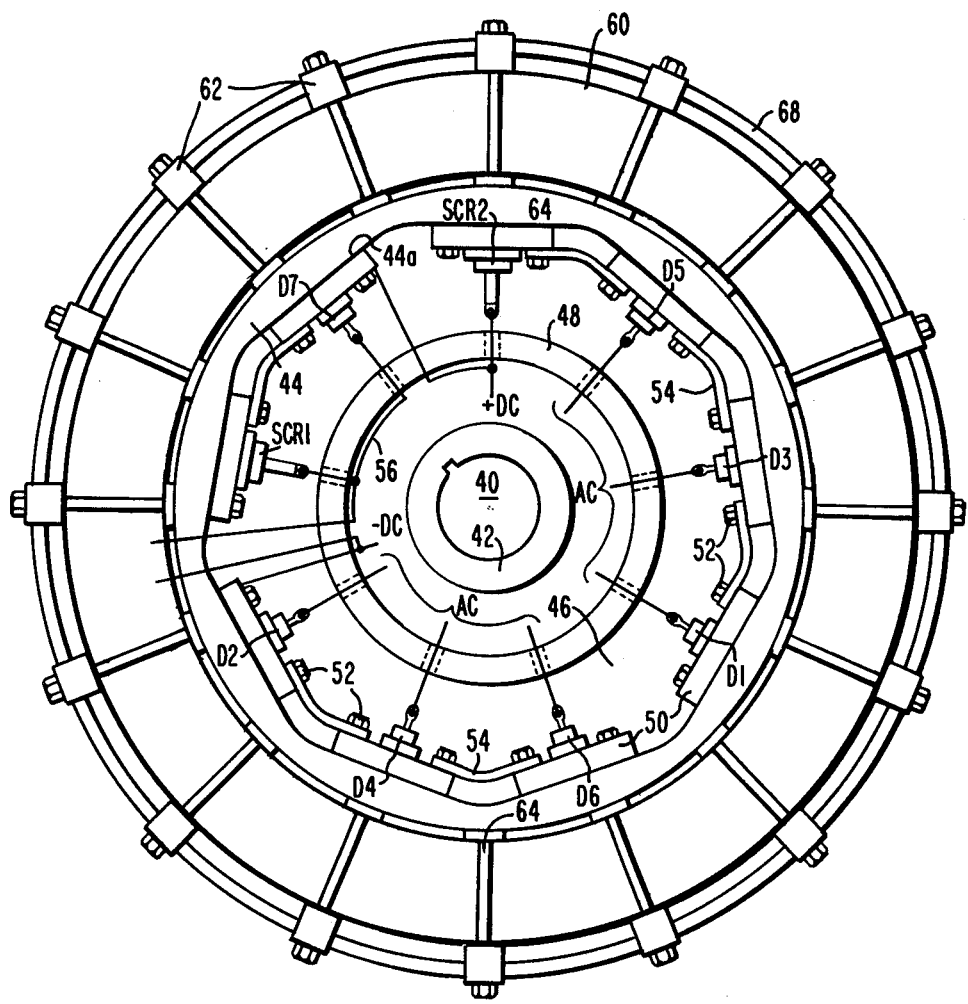
FIG. 4 is an end view of the assembly of FIG. 3.

FIGS. 3 and 4 illustrate an embodiment of the present invention including a molded control wheel 40 that in physical shape is similar to, but shorter in axial length than, previously built aluminum wheels. The molded wheel is formed from insulating material such as glass fiber reinforced polyester resin and has as its principal elements a hub portion 42, a rim portion 44, a radial plate 46 and a conductor support ring 48 all molded as a unitary mass. The view of FIG. 3 is of half of the substantially symmetrical structure. Diode and thyristor heat sinks 50 are bolted directly to the inner surface of the rim 44, eliminating the need for insulated bolts and insulating heat sink pads as have been used heretofore. Furthermore, the molding of the wheel makes it easy to provide flat surface portions of inner rim surface 44a at the locations for mounting the heat sinks 50 for the solid-state diodes and SCR's which are numbered in FIG. 4 in accordance with FIG. 1. The flat surfaces 44a are of significant advantage in that they permit the use of standard flat-surfaced heat snks rather than requiring the manufacture of specially configured heat sinks for mounting onto a curved surface. Because the insulating wheel 40 avoids the need for extra insulation, the heat sink mounting bolts 52 can be used as electrical connection points for the conductors 54 extending between the solid-state elements such as is shown in FIG. 4.

The conductor support ring 48 molded as part of the wheel 40 will resist the rotational forces present on the connecting cables 56 during motor operation. The use of an insulating ledge such as this simplifies the clamping and support requirements and allows the use of a simple clamp arrangement 58 as shown in FIG. 3 as opposed to the relatively difficult arrangement as used in the structure of FIG. 2.

While the molded wheel alone is regarded as a significant advance in excitation system construction, the depicted embodiment further includes a low cost, easily manufactured, compact starting resistor 60 that will avoid problems previously encountered in such systems. The resistor 60 consists of insulated copper, brass, or bronze wire which is wound spool-like onto the top surface of the control wheel rim 44. An even number of coils is desirable to allow their connection in such a manner that the completed coils are magnetically opposed to minimize mutual inductance. Four coils 60a, 60b, 60c, and 60d are shown in FIG. 3. The height, number, and size of the coils will depend upon the required resistor characteristics for a given motor design. The control wheel-resistor configuration is flexible in this regard since only the internal diameter of the coil is fixed by the wheel construction. The length of the resistor windings on the final outside diameter of the completed wheel is subject to design variation, in addition, of course, to the fact that the control wheel 40 can be molded with a desired axial length for the rim 44. This allows the starting resistor 60 to be easily wound and sized for the individual motor design.

The variability of the outside diameter of the completed control wheel 40 and resistor 60 requires that a structural support method be used which is easily adaptable to a variety of diameters. This is taken care of with a clamping arrangement that provides a radial compressive force to support the wire against rotational forces. A plurality of clamps 62 are spaced around the outside of the coils of the resistor 60. The clamps 62 are of molded insulating material and are fastened by bolts 64 to the rim. In addition, the clamps 62 preferably are configured with depressions 66 at locations over each individual coil 60a, 60b, 60c, and 60d so as to accept and locate glass or wire banding 68. The assembled control wheel can be slipped onto a winding shaft and an appropriate quantity of glass fiber reinforced-epoxy resin or other banding applied over the clamps 62. The preloading, or tensioning, of the banding 68 will compressively load the wound resistor and diode wheel providing the necessary strength to resist rotational forces. Relatively small motors, which can be built with small diameter control wheels, will probably not require the addition of the banding and may be used just with the clamps. The disclosed configuration offers sufficient flexibility to allow the use of a standard, molded control wheel for large, high speed motors as well as smaller or lower speed motors.

The wound resistor 60 has been designed to be self-ventilating to prevent thermal failure of the resistor in the event a component fails and the resistor remains in the circuit continuously. Air inlet channels 44b (one or more) are molded into the top surface of the wheel rim 44 to provide axial ventilation passages into the windings. Also, the bolts 64 in the spaces between the windings provide transverse wire support to prevent the coils from shifting laterally. A fan action occurs which will pump air radially between the coils 60a, 60b, 60c, and 60d. The air exits at the top of the coils between the bolted on clamps 62 after flowing axially underneath the banding 68. The arrows in FIG. 3 illustrate the air flow paths.

Recapitulating some of the advantages of the invention, a reduced resistor volume compared to the prior art is possible since the heat storage capacity of the wire wound resistor 60 can be made large and utilized during the starting sequence. This will result in a control wheel that has a smaller diameter and shorter length than the former design. The molded conductor support ring 48 will eliminate the high strength clamping required previously. It will also allow the use of commercially available cable instead of custom-designed, hand-insulated, rolled copper strap. Control wheel construction costs will be markedly reduced, such as by avoiding the need for machining the control wheel. Insulating pads for the heat sinks are eliminated and insulated heat sink bolts are no longer required. The molded wheel has an available insulating surface such as the portion of surface 44a to the right of heat sink 50 as shown in FIG. 3 for the location of a diagnostic slip ring unit. Such a unit is mounted when desired for rotation with the wheel for monitoring the operation of the brushless excitation system. It could also be used in case of problems with the excitation system to apply DC from an external source to the field winding directly.

Figure 5:
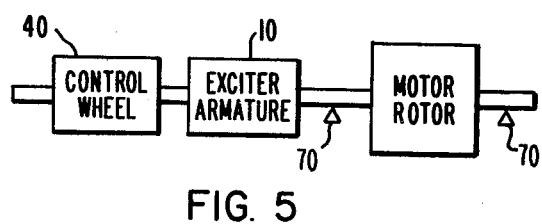
FIG. 5 is a schematic view of a dynamoelectric machine with a brushless exciter mounted on a shaft and incorporating an embodiment of the present invention.

The smaller size and weight of the wheel 40 will allow it to be mounted outboard of the motor bearing and exciter. This is an accordance with the configuration schematically shown in FIG. 5. The motor is provided with bearings 70 at its opposite ends. The exciter armature 10 and control wheel 40 are provided at the outboard side of one of the bearings 70 and do not require an additional bearing when they are sufficiently small and light as the molded wheel 40 permits.

Furthermore, the design provides an easily manufactured resistor 60 that avoids the costs of custom rolling strip heaters as previously required.

Commercial heat sink extrusions can be used which will improve the performance of the system and allow the use of smaller diodes and thyristors. That is because the present design practice requires derating components to account for the limited capability of the specially manufactured heat sinks required to mount on the curved surface of the aluminum wheel.

The inventive design provides considerable design flexibility and it may be adapted to a variety of situations. For example, for very large diameter, high speed control wheels, a metallic support ring may be used on the top surface of the rim 44 of the molded wheel 40, or on top of the starting resistor 60 if one is used, for additional strength. Molded inserts for wheels designed with traditional technology, i.e., aluminum wheels, to eliminate the cost associated with conductor support and insulation of heat sinks and attachments may be provided. Metallic support rings molded within the wheel 40 for additional strength is another option. In this instance the metallic support would provide some skeletal portion of the structure while the molded insulating material provides the component mounting surfaces and the desired degree of electrical isolation. Use of a metallic hub and plate for attachment to the motor shaft with a bolted on molded wheel to contain the diodes and resistors in another form in which the invention may be used.

It is therefore seen that the present invention provides excitation equipment in a more economical and reliable form and permits a high degree of design flexibility.

We claim:

1. A brushless dynamoelectric machine comprising:
   a rotatable shaft;
   a field winding located for rotation with said shaft;
   excitation control means for applying direct current excitation to said field winding and comprising a rectifier bridge, starting control circuitry and a field discharge resistor all mounted for rotation with said shaft on a control wheel including a radially extending plate portion and an axially extending rim portion of an outer end of said plate portion, said plate and rim portions of said control wheel being of a unitary mass of molded insulating material;
   a plurality of elements of said rectifier bridge and said starting control circuitry arranged on an inner surface of said rim portion;
   said field discharge resistor comprising a plurality of conductive winding turns on an outer surface of said rim portion; and means for radially compressively clamping said field discharge resistor to said rim portion.

2. A brushless dynamoelectric machine in accordance with claim 1 wherein:
   said control wheel and said unitary mass of molded insulating material further includes a hub portion at an inner end of said plate portion, said hub portion comprising an axially extending flange encircling said shaft and having means for joining said control wheel in fixed position on said shaft.

3. A brushless dynamoelectric machine in accordance with claim 2 wherein:

said unitary mass of molded insulating material provides substantially all of the mechanical support of said control wheel.

4. A brushless dynamoelectric machine in accordance with claim 1 wherein:
said control wheel comprises said unitary mass of molded insulating material in combination with at least one metal support element which is electrically isolated by said unitary mass of molded insulating material from said plurality of elements of said rectifier bridge, said starting control circuitry and said field discharge resistor.

5. A control wheel assembly for brushless synchronous machines comprising:
a hub with means for joining to a rotatable shaft;
a rim of substantially cylindrical configuration concentric with the shaft disposed outwardly from said hub;
radial support means for joining said rim and said hub;
a plurality of solid-state rectifier and switching elements mounted on a radially inward surface of said rim and interconnected in a brushless excitation control circuit;
a starting resistor of wire wound on a radially outward surface of said rim and interconnected in said brushless excitation control circuit;
said starting resistor comprising a plurality of turns of insulated wire in a plurality of spaced coils with radial ventilation passages therebetween.

6. A control wheel assembly in accordance with claim 5 wherein:
said plurality of spaced coils are of an even number serially interconnected so adjacent coils have oppositely directed current flow and low mutual inductance.

7. A control wheel assembly in accordance with claim 5 further comprising:
clamping means for securely holding said starting resistor on said rim.

8. A control wheel assembly in accordance with claim 7 wherein:
said clamping means comprises a plurality of axially extending clamps in spaced relation from each other on the outside of said starting resistor.

9. A control wheel assembly in accordance with claim 8 wherein:
said clamping means further comprises a plurality of layers of insulative banding material wrapped concentrically with the shaft over said plurality of axially extending clamps to apply radial inward compression thereon.

10. A control wheel assembly in accordance with claim 9 wherein:
said rim comprises a substantially unitary mass of molded insulating material serving both to mechanically support thereon and electrically insulate therethrough said plurality of solid-state elements and said starting resistor;
said mass of said rim having one or more axially extending channels in said radially outward surface thereof extending under said coils of said starting resistor providing axial ventilation passages communicating with said radial ventilation passages;
said plurality of axially extending clamps are of molded insulating material each having a plurality of depressions in the outer surface thereof each for receiving and confining some turns of said plurality of layers of insulative banding material;
a plurality of radial extending insulative bolts joining said clamps to said rim,
said bolts being located at the outer ends of said clamps and also between said depressions for said banding material to extend outside said coils and between said adjacent coils of said starting resistor through said radial ventilation passages and to further serve to restrain said coils from axial displacement.

11. A brushless dynamoelectric machine in accordance with claim 3 wherein:
said control wheel further comprises an axially extending conductor support ring joined to said plate portion between said hub and rim portions for supporting thereron conductive interconnections between elements of said rectifier bridge and said starting control circuitry.

12. A control wheel assembly for a brushless dynamoelectric machine comprising:
a hub with means for joining to a rotatable shaft;
a rim of substantially cylindrical configuration concentric with the shaft, said rim comprising a body of molded insulating material;
radial support means for joining said rim and said hub;
said rim body of molded insulating material having a radially inner surface with a plurality of flat surface portions, each of said flat surface portions having a flat-surfaced heat sink mounted thereon, each heat sink having a solid-state device directly mounted thereon, means for interconnecting said solid-state devices into a rectifier bridge and starting control circuit.

13. A control wheel assembly in accordance with claim 12 wherein:
said radial support means is a plate of molded insulating material integrally joined with said body of molded insulating material of said rim.

14. A control wheel assembly in accordance with claim 12 wherein:
said hub, said radial support means and said rim body are parts of a unitary mass of molded insulating material.

15. A control wheel assembly in accordance with claim 12 wherein:
each of said heat sinks is mounted on said rim body by at least one conductive bolt which also serves as a connection point for a conductor forming part of said means for interconnecting said solid-state devices into a rectifier bridge and starting control circuit.

16. A control wheel assembly in accordance with claim 14 wherein:
said unitary mass of molded insulating material further includes a conductor support ring extending axially from said radial support means between said hub and said rim, and conductors are mounted on the radially inner surface of said conductor support ring and have direct radial interconnections to said solid-state devices on said rim, said conductors and said radial interconnections forming part of said means for interconnecting said solid-state devices into a rectifier bridge and starting control circuit.

17. A brushless dynamoelectric machine in accordance with claim 1 wherein:
said shaft is supported on a bearing located axially inward of said control wheel and no bearing support is axially outward of said control wheel.

* * * * *